M. E. PEARSON.
GRAIN TREATING APPARATUS.
APPLICATION FILED MAR. 28, 1916.
1,218,114.
Patented Mar. 6, 1917.
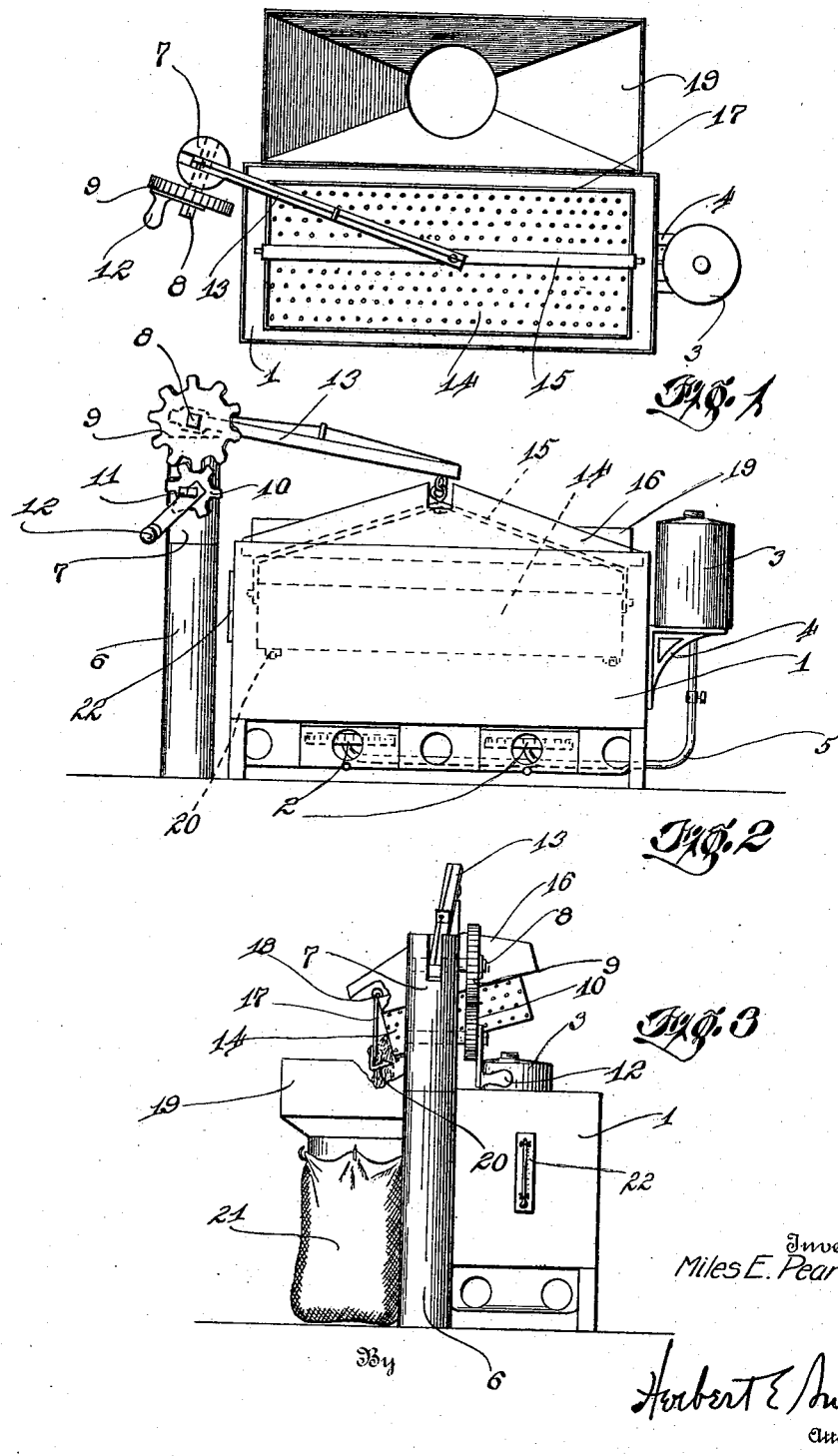
Inventor
Miles E. Pearson
By Herbert E. Smith
Attorney

UNITED STATES PATENT OFFICE.

MILES E. PEARSON, OF PULLMAN, WASHINGTON.

GRAIN-TREATING APPARATUS.

1,218,114.　　　Specification of Letters Patent.　　Patented Mar. 6, 1917.

Application filed March 28, 1916. Serial No. 87,223.

*To all whom it may concern:*

Be it known that I, MILES E. PEARSON, a citizen of the United States, residing at Pullman, in the county of Whitman and State of Washington, have invented certain new and useful Improvements in Grain-Treating Apparatus, of which the following is a specification.

This invention relates to new and useful improvements in grain treating apparatus and the primary object is to provide a device for treating grain seed such as wheat, whereby to eliminate the smut germ from the ensuing crop.

There are numerous devices known for this purpose, but my object is to provide a device which is simpler in construction than those heretofore known, inexpensive to manufacture and one which will be generally more efficient in every respect than previous grain treating devices.

With these and other objects in view, my invention consists generally in the various constructions and combinations as herein-constructions and more particularly described and pointed out in the specification and claims.

In the accompanying drawing forming a part of this application:—

Figure 1 is a top plan view of a device constructed in accordance with my invention;

Fig. 2 is a front elevation thereof; and

Fig. 3 is an end elevation of the same.

In describing the invention I shall refer to the drawing in which similar reference characters designate corresponding parts throughout the several views and in which 1 designates a tank adapted to contain water and certain germ killing ingredients, such as arsenic and the like and arranged below said tank are the burners 2 for heating the contents thereof. An oil reservoir 3 is provided, the same being supported on a bracket or the like 4 carried on said tank and a conduit 5 leads from said reservoir to the burners. Any other desired form of fuel may be provided, if necessary.

Arranged immediately adjacent one end of the tank 1 is a vertical post 6 upon the upper end of which is rotatably mounted a section 7. Rotatable on a horizontal axis on said section 7 is a shaft 8 which carries a gear 9 and the latter gear meshes with a pinion 10 rotatably carried on the side of the section 7 of the post. This gear 10 is supported on the shaft 11 which is adapted to be rotated by means of a crank handle 12.

The upper end of the section 7 of the post is bifurcated and through this bifurcated portion extends the shaft 8. Carried on this shaft is a supporting arm or the like 13 to the outer end of which is engaged a perforated pan or the like 14, the latter being substantially rectangular in design and adapted to be received readily in the tank 1. This pan 14 is supported from the arm 13 by means of a bail 15, the latter being pivoted at its ends to said pan and a top member 16 is provided for the pan 14, said top being considerably larger than the pan and designed to form substantially a top for the complete device, tank included.

One side wall of this pan 14 is formed as a door or the like, the same being designated in the drawing as 17 and said door is hinged at its upper end as designated at 18, so that when the pan is tilted, after being raised from the tank and disposed somewhat laterally thereof, the contents of said pan may readily flow therefrom into a hopper 19 at one side of the tank, as clearly shown in Fig. 3 of the drawing. The lower end of this door or the like 17 has a spring lock 20 thereon which secures the same in place when closed. A sack or the like 21 is arranged below the hopper 19 to receive the grain therein as the same is emptied from the pan.

It is apparent from this construction that the grain is first placed in a pan 14 and the latter lowered into the tank 1 where said grain is heated in the water mixed with the germ killing ingredients. A thermometer 22 is provided on the tank 1 to indicate the heat within the latter and when the grain has been heated to a predetermined degree the pan is raised by operating the handle 12 and the arm 13 disposed to one side toward the hopper 19. The door 17 is then unlatched and the pan tilted so that the contents may be emptied into the hopper and finally into the sack 21. The operation is thus completed and the smut germs removed from the grain.

From the foregoing description of the construction of my device the operation thereof will be readily understood.

While I have particularly described the elements best adapted to perform the functions set forth, it is obvious that various changes in form, proportion and in the minor details of construction may be resorted to, without departing from the spirit or sacrificing any of the principles of the invention.

Having thus described my invention, what I claim and desire to secure by Letters Patent, is:—

1. In a grain treating apparatus, a tank adapted to contain a liquid, a receiving hopper adjacent to said tank, a support adjacent to said tank, a rotatable section mounted on said support, gear shafts journaled in said section, gears carried by said shafts, an arm mounted upon one of said shafts, a grain pan carried by the said arm, and means for operating said gears.

2. In a grain treating apparatus, a tank adapted to contain a liquid, a receiving hopper adjacent to said tank, a support adjacent to said tank, a rotatable bifurcated section mounted on said support, a gear shaft journaled in said section transversely of the bifurcated portion thereof, an arm mounted upon the said shaft, a gear mounted on said shaft, and means for raising and lowering said arm by rotation of said gear.

3. In a grain treating apparatus, a tank adapted to contain a liquid, a receiving hopper adjacent to said tank, a support adjacent to said tank, a rotatable section mounted on said support, gear shafts journaled in said section, gears carried by said shafts, an arm mounted upon one of said shafts, a tiltable grain pan carried by the said arm, a hinged closure for the said pan, and means for operating said gears.

In testimony whereof I affix my signature.

MILES E. PEARSON.

Copies of this patent may be obtained for five cents each, by addressing the "Commissioner of Patents, Washington, D. C."